US012742963B2

(12) United States Patent
Graf et al.

(10) Patent No.: US 12,742,963 B2
(45) Date of Patent: Sep. 22, 2026

(54) METHOD FOR SCANNING FIELD CORRECTION AT LEAST OF A LASER SCANNER DEVICE, LASER SCANNER DEVICE, SCATTER PATTERN ELEMENT, SCATTER PATTERN HOLDING DEVICE AND SCANNING FIELD CORRECTION SYSTEM

(71) Applicant: NOVANTA EUROPE GMBH, Wackersdorf (DE)

(72) Inventors: Alexander Graf, Bodenwöhr (DE); Florian Klemmer, Lappersdorf (DE); Thomas Buckert, Burgthann (DE); Martin Hartmann, Burgthann (DE)

(73) Assignee: NOVANTA EUROPE GMBH, Wackersdorf (DE)

( * ) Notice: Subject to any disclaimer, the term of this patent is extended or adjusted under 35 U.S.C. 154(b) by 386 days.

(21) Appl. No.: 18/276,945

(22) PCT Filed: Feb. 8, 2022

(86) PCT No.: PCT/EP2022/052982
§ 371 (c)(1),
(2) Date: Aug. 11, 2023

(87) PCT Pub. No.: WO2022/171609
PCT Pub. Date: Aug. 18, 2022

(65) Prior Publication Data

US 2024/0134188 A1 Apr. 25, 2024
US 2024/0231081 A9 Jul. 11, 2024

(30) Foreign Application Priority Data

Feb. 15, 2021 (DE) ........................ 102021103493.0

(51) Int. Cl.
*G02B 26/08* (2006.01)
*G02B 5/02* (2006.01)
(Continued)

(52) U.S. Cl.
CPC ......... *G02B 27/0031* (2013.01); *G02B 5/021* (2013.01); *G02B 26/101* (2013.01)

(58) Field of Classification Search
CPC ... G02B 27/0031; G02B 5/021; G02B 26/101
See application file for complete search history.

(56) References Cited

U.S. PATENT DOCUMENTS 5,430,666 A 7/1995 DeAngelis et al. ....... 250/491.1
5,832,415 A 11/1998 Wilkening et al. ............. 702/86
(Continued)

FOREIGN PATENT DOCUMENTS

DE 4437284 A1 4/1996 ........... B23K 26/042
DE 19732668 A1 2/1999 ........... B23K 26/042
(Continued)

OTHER PUBLICATIONS

Sung Joon Ahn, et al., "*Circular Coded Target for Automation of Optical 3D-Measurement and Camera Calibration*", International Journal of Pattern Recognition and Artificial Intelligence (IJPRAI), World Scientific Publishing, SI, vol. 15, No. 6, Sep. 1, 2001, pp. 905-919, XP001110382. Abstract and full text available at: https://www.worldscientific.com/doi/10.1142/S0218001401001222 (last accessed on Dec. 13, 2023).
(Continued)

*Primary Examiner* — Euncha P Cherry
(74) *Attorney, Agent, or Firm* — Bodner & Bodner, PLLC; Christian P. Bodner; Gerald T. Bodner

(57) ABSTRACT

The invention relates to a method for scanning field correction at least of a laser scanner device (300), wherein the method comprises the following steps: —providing a scatter
(Continued)

pattern element (30) on a processing plane (11), wherein the scatter pattern element (30) comprises at least one scatter region (31) which is arranged in a scatter pattern (M); —passing over or scanning at least one part of the scatter pattern element (30) on the processing plane (11) by means of a laser beam (12) of the at least one laser scanner device (300) along scanner coordinates (x, y, z), wherein the laser beam passes through at least one window (20), preferably protective glass, between a deflection unit (10) and the processing plane (11); —detecting scatter radiation (13) which can be generated by scattering and/or reflection of the laser beam (12) when passing over or scanning the at least one scatter region (31); —creating a contour diagram (K) by correlating the detected scatter radiation (13) with the scanner coordinates (x, y, z); —comparing the contour diagram (K) with a reference image of the scatter pattern (M) and determining a deviation of the contour diagram (K) from the reference image of the scatter pattern (M); —calculating a calibration function for calibrated control of the deflection unit (10) on the basis of the determined deviation.

19 Claims, 6 Drawing Sheets

(51) Int. Cl.
*G02B 26/10* (2006.01)
*G02B 27/00* (2006.01)

(56) References Cited

U.S. PATENT DOCUMENTS

| | | | | |
|---|---|---|---|---|
| 5,978,081 | A | 11/1999 | Michael et al. | 356/243.1 |
| 10,184,828 | B2 | 1/2019 | Kramer et al. | |
| 10,345,561 | B2 | 7/2019 | Weber | |
| 11,255,723 | B2 | 2/2022 | Kramer et al. | |
| 11,662,533 | B2 | 5/2023 | Fuchs et al. | 385/52 |
| 2003/0228904 | A1* | 12/2003 | Acres | G07F 17/3227 463/26 |
| 2017/0188015 | A1 | 6/2017 | Heidemann et al. | |
| 2018/0056392 | A1 | 3/2018 | Ichijo | |
| 2018/0281067 | A1* | 10/2018 | Small | B33Y 50/02 |
| 2019/0210289 | A1 | 7/2019 | FrantzDale et al. | |
| 2020/0282657 | A1* | 9/2020 | Wighton | B29C 64/268 |

FOREIGN PATENT DOCUMENTS

| | | | | |
|---|---|---|---|---|
| DE | 69837379 | T2 | 12/2007 | B23K 67/00 |
| DE | 102010036161 | A1 | 3/2012 | B23K 26/42 |
| DE | 102010060958 | A1 | 6/2012 | B23K 26/02 |
| DE | 102010036161 | B4 | 10/2013 | B23K 26/42 |
| DE | 102015004163 | B4 | 3/2017 | B23K 26/04 |
| DE | 102016009475 | A1 | 2/2018 | G01J 1/02 |
| DE | 102018210270 | A1 | 1/2020 | |
| EP | 0148138 | A1 | 7/1985 | G01B 11/00 |
| EP | 1598861 | A1 | 11/2005 | G06K 19/077 |
| EP | 2119531 | A1 | 11/2009 | F16P 1/06 |
| EP | 2119531 | B1 | 7/2014 | F16P 1/06 |
| EP | 3511122 | A1 | 7/2019 | B23Q 17/24 |
| EP | 3702158 | A1 | 9/2020 | |
| JP | 2019104049 | A | 6/2019 | B23K 26/082 |
| KR | 960002808 | Y1 | 4/1996 | H01S 3/10 |
| KR | 20130121413 | A | 11/2013 | H01L 21/027 |
| WO | WO9833059 | A1 | 7/1998 | B23K 26/00 |
| WO | WO2009026520 | A1 | 2/2009 | B29C 67/00 |
| WO | WO2018129089 | A1 | 7/2018 | B29C 64/141 |
| WO | WO2019089323 | A1 | 5/2019 | B22F 3/105 |
| WO | WO2019139561 | A1 | 7/2019 | |
| WO | WO2020190779 | A1 | 9/2020 | |

OTHER PUBLICATIONS

Andreas Koglbauer, "*More Than Beam Profiling*", Laser Technik Journal, vol. 15, Issue 3, May 24, 2018, pp. 40-44. Abstract and full text available at: https://onlinelibrary.wiley.com/doi/full/10.1002/latj.201800016 (last accessed on Dec. 13, 2023).

"*EALA—European Automotive Laser Applications 2020*", YouTube, uploaded by Automotive Circle, Mar. 16, 2020. Video available at: https://www.youtube.com/watch?v=V6PxZaXJ0BE (last accessed on Dec. 13, 2023).

The Notification Concerning Transmittal of International Preliminary Report on Patentability (Chapter I of the Patent Cooperation Treaty), in English, dated Aug. 24, 2023, which was issued by the International Bureau of WIPO in Applicant's corresponding international PCT application having Serial No. PCT/EP2022/052982, filed on Feb. 8, 2022.

The English translation of the International Preliminary Report on Patentability (Chapter I of the Patent Cooperation Treaty), dated Aug. 15, 2023, which was issued by the International Bureau of WIPO in Applicant's corresponding international PCT application having Serial No. PCT/EP2022/052982, filed on Feb. 8, 2022.

The Written Opinion of the International Searching Authority, in English, dated Jul. 22, 2022, which was issued by the International Bureau of WIPO in Applicant's corresponding international PCT application having Serial No. PCT/EP2022/052982, filed on Feb. 8, 2022.

The International Search Report, in English, dated Jul. 22, 2022, which was issued by the International Bureau of WIPO in Applicant's corresponding international PCT application having Serial No. PCT/EP2022/052982, filed on Feb. 8, 2022.

An Office Action (in German), dated Nov. 16, 2021, issued by the German Patent Office for Applicant's corresponding German Patent Application No. DE102021103493.0, filed Feb. 15, 2021.

Sung Joon Ahn, et al., "*Circular Coded Target for Automation of Optical 3D-Measurement and Camera Calibration*", International Journal of Pattern Recognition and Artificial Intelligence (IJPRAI), World Scientific Publishing, SI, vol. 15, No. 6, Sep. 1, 2001, pp. 905-919, XP001110382.

Andreas Koglbauer, "*More Than Beam Profiling*", Laser Technik Journal, vol. 15, Issue 3, May 24, 2018, pp. 40-44.

* cited by examiner

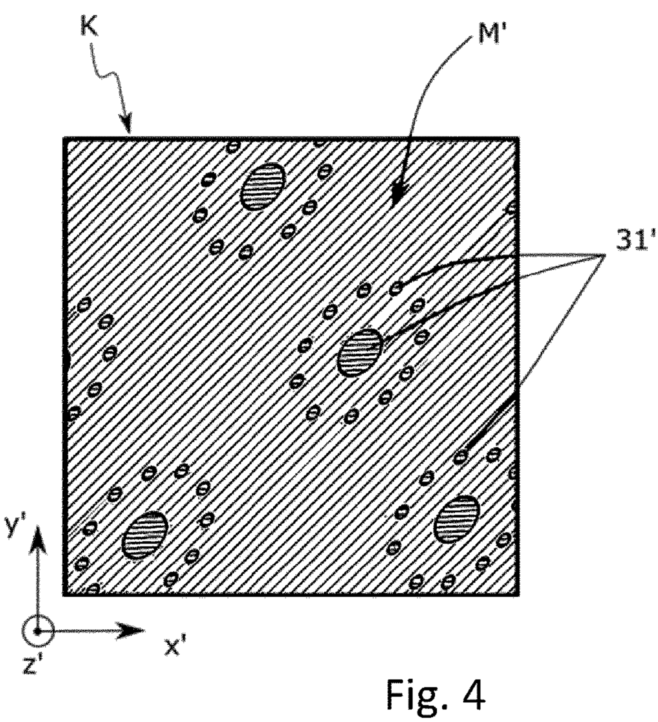
Fig. 4
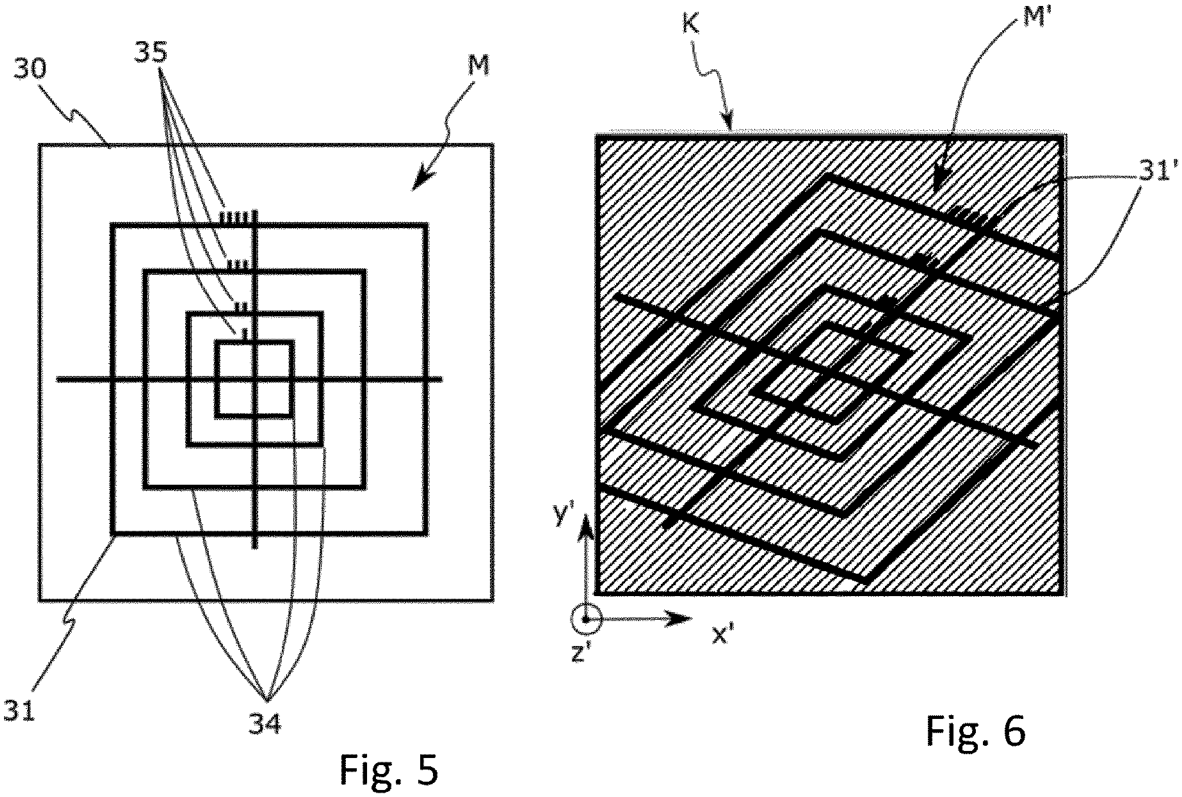
Fig. 5
Fig. 6

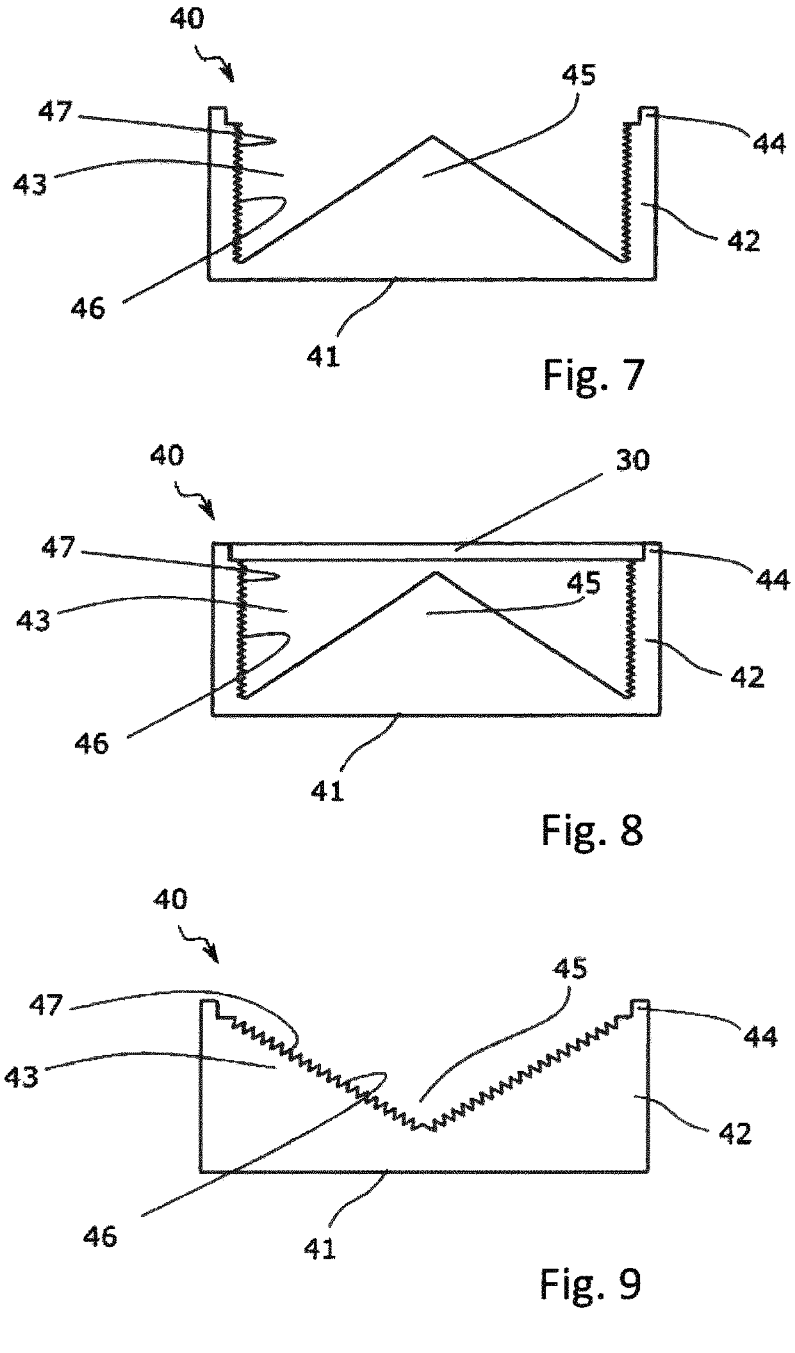
Fig. 7
Fig. 8
Fig. 9
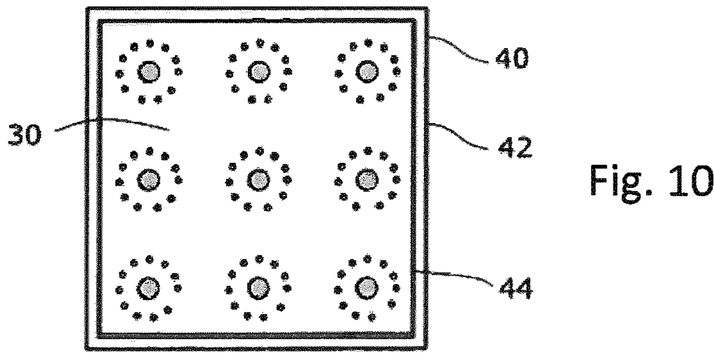
Fig. 10

METHOD FOR SCANNING FIELD CORRECTION AT LEAST OF A LASER SCANNER DEVICE, LASER SCANNER DEVICE, SCATTER PATTERN ELEMENT, SCATTER PATTERN HOLDING DEVICE AND SCANNING FIELD CORRECTION SYSTEM

The present invention relates to a method for a scanning field correction of at least one laser scanner device, a laser scanner device, a scatter pattern element, a scatter pattern element holding device, as well as a scanning field correction system.

Conventional scanning modules or laser scanner devices, respectively, can position the laser spot in all three directions in space with high accuracy and repeatability within a certain operating volume. The beam deflection required for this purpose in the x and y direction generally takes place via two deflection mirrors, while the focusing in the z direction is mostly performed by displacement of the optics or also by changing the setting parameters of a zoom lens.

For design as well as tolerance reasons, both mechanical motion sequences are non-linear in the space coordinates x, y, z and would thus lead to distortion errors in a desired trajectory in response to a linear control. A control software has to thus be pre-corrected accordingly, in order to guide the laser beam in a geometrically correct manner, that is, in a distortion-free manner.

Due to a high accuracy demand, a corresponding pre-distortion function for a scanning field correction can only be determined experimentally.

A pre-distortion function of this type for a scanning field correction has to be determined separately and manually for each laser scanner device. For this purpose, patterns are applied in paper or metal by means of the processing laser in various steps and are measured in a time-consuming manner.

Depending on a respective demand of the individual laser scanner device, the measuring is performed by eye or by means of external measuring machines, such as, for example, a coordinate measuring machine. The conventional methods are thus comparatively inaccurate (measuring by eye) or extremely time consuming (coordinate measuring machine).

It is thus the object of the invention to provide a method, which makes it possible to perform a highly precise scanning field correction of a laser scanner device in a simple and reproducible manner.

It is a further object of the invention to provide a further developed laser scanner device comprising a scanning field-correctable deflection unit.

It is furthermore an object of the invention to provide an improved scatter pattern element, by means of which in particular a further developed method for the scanning field correction of a laser scanner device can be performed in a particularly advantageous manner.

It is additionally an object of the invention to specify a scatter pattern holding device, which is particularly well suited for fixing a scatter pattern element, in particular a scatter pattern element according to the invention, so that a method for the scanning field correction of a laser scanner device can preferably be performed in a particularly advantageous manner.

It is a further object of the invention to specify a further developed scanning field correction system.

With regard to a method for a scanning field correction of at least one laser scanner device, the object is solved by means of the subject matter of one or more of the claims, with regard to a laser scanner device by means of the subject matter of one or more of the claims, with regard to a scatter pattern element by means of the subject matter of one or more of the claims, with regard to a scatter pattern element holding device by means of the subject matter of one or more of the claims, as well as with regard to a scanning field correction system by means of the subject matter of one or more of the claims.

The object is solved in particular by means of a method for a scanning field correction of at least one laser scanner device, wherein the method has the following steps:

- providing a scatter pattern element on a processing plane, wherein the scatter pattern element has at least one scatter region, which is arranged in a scatter pattern;
- passing over or scanning, respectively, in particular passing over or scanning, particularly preferably passing over and/or scanning, at least a part of the scatter pattern element on the processing plane by means of a laser beam of the at least one laser scanner device along scanner coordinates,
- wherein the laser beam passes through at least one window, preferably at least one protective glass, between a deflection unit and the processing plane;
- detecting scatter radiation, which can be generated by scattering and/or reflection of the laser beam when passing over or scanning, respectively, in particular when passing over or scanning, particularly preferably when passing over and/or scanning, the at least one scatter region;
- creating a contour diagram by a correlation of the detected scatter radiation with the scanner coordinates;
- comparing the contour diagram with a reference image of the scatter pattern and determining a deviation of the contour diagram from the reference image of the scatter pattern;
- calculating a calibration function for a calibrated control of the deflection unit on the basis of the determined deviation.

An essential idea of the invention is that a calibration function or a pre-distortion function, respectively, of an operative laser scanner device, i.e. which is already installed in a (laser) processing machine, can be inspected by the operator, where required (or at regular intervals) and can be adapted, if necessary. The reasons for this are, for example, a change of components, such as the laser source, the photodiodes, the removal and reinstallation of further optical components (e.g. for cleaning purposes), but also the routine inspection after a certain number of operating hours. Misalignments caused during operation by means of thermal or mechanical stresses, such as shock or vibrations, can be detected and compensated in this way.

A minimal effort for the user can thus be attained with high precision of the scanning field correction. The necessary measuring equipment (here: the scatter pattern element) is to be capable of being placed easily on the processing plane, the required measurements are to be capable of being performed and evaluated without further input from the operator, and the calibration function for the scanning field correction is to be capable of being calculated fully automatically on the basis of the contour diagram.

A contour diagram is preferably understood to be an intensity (profile) plot. Wherein the amplitude of the contour diagram of an amplitude of the photodiode signal (or of the integrated photodiode signals) is specified, for example, in "counts", or the amplitude is standardized to 1 (standardized to the highest photodiode signal).

It is thereby in particular also a further idea of the invention to perform the calibration by means of the (processing) laser or (processing) laser beam itself, respectively, and not by means of a (separate) calibrating laser. The accuracy can be increased in this way because an offset to the actual laser beam usually exists when using calibrating lasers, and the calibration does not take place under "normal conditions". For example, the heat resulting during the processing in the optical system of the scanning device (due to high laser power) can thus be considered directly during the calibration. The calibration or the scanning field correction, respectively, thus becomes largely invariant to external influences.

In one embodiment, a part of the scatter radiation can spread via reflection(s) and/or scattering between a window top side and a window bottom side within the window at least towards a section of a window edge of the window in such a way that the scatter radiation escapes from the window edge of the window and can be detected there.

A reflection on the window and/or the transmission of the light through the window and/or the multiple reflection on a window top side and bottom side is/are a cost-efficient and simple option for weakening the intensive laser beam, so as not to saturate corresponding detectors, by means of which the light is detected. The arrangement can furthermore be realized in a particularly space-saving manner.

A large amount of scattered light can additionally be collected in this way because the entire aperture is utilized. It is made possible in this way to collect the scatter radiation (of the scatter pattern element) not only from the direct field of view of a photodiode, but to also detect it indirectly via reflections and/or scattering within the window. The method or the light detection, respectively, can thus be performed in a largely directionally independent manner.

In a preferred embodiment, the detection of the scatter radiation takes place on at least one section of a/the window edge of the window.

The detectors can be arranged permanently in this way and do not have to be removed, for example, after a calibration.

In one embodiment, the detection of the scatter radiation takes place by means of at least one photodiode, preferably by means of two, more preferably by means of at least three photodiode(s), wherein several photodiodes are preferably distributed equidistantly.

In other words, the photodiodes can be arranged along the circumference of a window in such a way that the photodiodes are in each case arranged at the same distance from one another.

Photodiodes can be acquired cost-efficiently and can be read out easily. The use of several photodiodes provides for the setting of a homogenous contour diagram, in particular when the photodiodes are arranged equidistantly. The more photodiodes are used, the larger the field of view/detection field. In order to create a homogenous contour diagram, it is increasingly less significant with an increasing number of photodiodes, from where the scattered light originates.

In one embodiment, an amplitude of the contour diagram is essentially proportional to the detected scatter radiation.

An optimal and reproducible data evaluation is thus made possible because the contour diagram has a correspondingly high signal-to-noise ratio. The calibration function can be determined precisely in this way. A further advantage thus lies in an interpolation and/or fit accuracy. A calculating effort and a calculating time can also be optimized in this way.

In one embodiment, the contour diagram comprises a scatter pattern image, which corresponds to a distorted illustration of the scatter pattern of the scatter pattern element in such a way that the contour diagram has several scatter region images, which can be assigned to the preferably several scatter regions of the scatter pattern element, in particular can be assigned unambiguously.

Due to the geometric, preferably unambiguous assignability, an orientation or identification of the scatter pattern element or at least of a subregion of the scatter pattern element can be determined reliably in a simple way. An unambiguous assignability, which can be identified easily, can save calculating effort and calculating time in this way, in order to accelerate the calibration process. This is also relevant in particular when two or several laser scanner devices are calibrated, in particular to one another or relative to one another, respectively, for example by using a (single or common, respectively) scatter pattern element on a (common) processing plane.

In one embodiment, the step for determining the deviation of the contour diagram from the scatter pattern comprises a step for the, preferably partial, fitting and/or interpolation of the contour diagram.

It is made possible thereby to automate the method by means of a calculation unit and by means of corresponding instructions for performing the method steps. The precision of the calibration can thus be optimized. The calculating time can be shortened further by only partial fitting and/or interpolation (for example only of relevant or particularly high-contrast parts of the contour diagram).

In one embodiment, the step for determining the deviation of the contour diagram from the scatter pattern comprises a step for determining contour diagram reference points, in particular of focal points and/or central points and/or shape distortions of several scatter region images of the contour diagram.

A data evaluation can be further optimized by determining contour diagram reference points. Specific (scatter) regions can be fitted/interpolated easily, thus in comparatively few steps or with comparatively small calculating effort or in comparatively short calculating time. For example, circles or circle centers are comparatively less susceptible with regard to noisy edges. The data evaluation can thus be accelerated and the precision can be increased.

In one embodiment, the step for determining the deviation of the contour diagram from the scatter pattern comprises a step for determining a deviation and/or shape distortions of contour diagram reference points from corresponding reference points of the reference image of the scatter pattern.

A data evaluation can be further optimized by determining reference points of the reference image of the scatter pattern. Specific (scatter) regions can be fitted/interpolated easily, thus in comparatively few steps or with comparatively small calculating effort or in comparatively short calculating time. For example, circles or circle centers are comparatively less susceptible with regard to noisy edges. The data evaluation can thus be accelerated and the precision can be increased.

The object according to the invention is likewise solved by means of a laser scanner device comprising a scanning field-correctable deflection unit, wherein the laser scanner device has the following:

- at least one deflection unit, which is formed to pass over or to scan, respectively, in particular to pass over or to scan, particularly preferably to pass over and/or to scan, a processing field by means of a laser beam, along predetermined scanner coordinates;

wherein a scatter pattern element can be arranged on the processing plane, wherein the scatter pattern element has at least one scatter region, which is arranged in a scatter pattern;

at least one window, preferably at least one protective glass, which is arranged between the deflection unit and the processing field;

at least one photodiode, which is formed to detect scatter radiation, which can be generated by means of scattering and/or reflection of the laser beam when passing over the scatter region of the scatter pattern element;

a calculation unit, which is formed to create a contour diagram by means of a correlation of the detected scatter radiation with the scanner coordinates, and to calculate a calibration function for a calibrated control of the deflection unit on the basis of a deviation of the contour diagram from a reference image of the scatter pattern.

This results in the same advantages as have already been described in connection with the method. A data evaluation of the contour diagram can be performed by means of the calculation unit by means of fitting and/or interpolation and/or contrast enhancement and/or threshold analysis and further image processing steps.

In one embodiment, two, preferably at least three, photodiodes are arranged on a section of the window edge of the window.

Photodiodes can be acquired cost-efficiently and can be read out easily. The use of several photodiodes provides for the setting of a homogenous contour diagram, in particular when the photodiodes are arranged equidistantly. The more photodiodes are used, the larger the field of view/detection field. In order to create a homogenous contour diagram, it is increasingly less significant with an increasing number of photodiodes, from where the scattered light originates.

In one embodiment, the at least one photodiode, preferably two, more preferably at least three, photodiodes is/are formed and/or arranged to detect a part of the scatter radiation, which spreads via reflections or scattering between a window top side and a window bottom side within the window towards a section the window edge of the window.

A reflection or scattering on the window and/or the transmission of the light through the window and/or the multiple reflection on a window top side and bottom side is/are a cost-efficient and simple option for weakening the intensive laser beam, so as not to saturate corresponding detectors, by means of which the light is detected.

The arrangement can furthermore be realized in a particularly space-saving manner. A large amount of scattered light can additionally be collected in this way because the entire aperture is utilized. It is made possible in this way to collect the scatter radiation (of the scatter pattern element) not only from the direct field of view of a photodiode, but to also detect it indirectly via reflections and/or scattering within the window. The method or the light detection, respectively, can thus be performed in a largely directionally independent manner.

In one embodiment, the at least one photodiode is formed to output a measuring signal to the calculation unit, which is essentially proportional to the detected scatter radiation.

In a preferred embodiment, an amplitude of the contour diagram is proportional to the detected scatter radiation or to the measuring signal of the at least one photodiode, respectively.

An optimal and reproducible data evaluation of the contour diagram is thus made possible because the contour diagram has a correspondingly high signal-to-noise ratio. The calibration function can be determined precisely in this way. A further advantage thus lies in an interpolation and/or fit accuracy. A calculating effort and a calculating time can also be optimized in this way.

The object according to the invention is likewise solved by means of a scatter pattern element for a scanning field correction of a laser scanner device, in particular according to a method as described above and/or in particular for a laser scanner device as described above.

The scatter pattern element is formed in a plate-shaped manner, preferably of glass or glass ceramic, in particular fused silica or Zerodur® or Borofloat, and has a scatter pattern, wherein the scatter pattern comprises several scatter regions, wherein the scatter regions are formed as roughened and/or an imprinted surface regions and/or holes of the scatter pattern element or within the volume of the scatter pattern element, wherein the scatter regions are arranged in the scatter pattern in such a way that an image of the scatter pattern or of a part thereof can be unambiguously identified in each rotation or shape distortion or reflection or scaling or translation.

It is an essential idea with regard to the scatter pattern element to provide a "target", which is not destroyed even in response to irradiation with high laser power. It is thus made possible that the laser scanner device can be calibrated directly by means of the (processing) laser beam. It is possible in an advantageous manner to forgo a separate calibrating laser.

This is not readily possible for every material due to the high laser power/intensity (for example >50 W or >100 W, for example CW or pulsed, for example NIR, focus size (to scatter pattern element) for example approx. 40 μm) and a target accuracy.

Static errors of the scatter pattern element, such as, e.g., "deflection" due to dead weight, evenness, positioning and manufacturing accuracy of the scatter regions, etc., as well as dynamic errors, such as, e.g., the thermal expansion during the measuring process, have to be minimized and/or considered in the following data evaluation of the contour diagram.

In one embodiment, the scatter regions comprise a first arrangement of first marker regions, preferably essentially circular first marker regions, wherein each of the first marker regions is surrounded by a plurality of second marker regions, preferably essentially circular second marker regions, in a second arrangement.

The image recognition/image processing or the data processing, respectively, can thus be optimized. For example, a difference between the first and the second arrangement can be selected so that the pattern can be identified or fitted efficiently, respectively, in the contour diagram. As a whole, a scatter pattern element is thus also obtained, which can be produced easily and which simplifies the data processing due to its scatter pattern. The calibration can take place quickly and precisely in this way.

In one embodiment, the second arrangement of the plurality of second marker regions for at least two, preferably for at least three, more preferably for each of the first marker regions, differs in particular in an angular arrangement and/or a number of the second marker regions.

The scatter pattern or an orientation of the scatter pattern, respectively, in particular the scatter pattern or an orientation of the scatter pattern, particularly preferably the scatter pattern and/or an orientation of the scatter pattern, can thus be detected by means of the contour diagram.

In one embodiment, the scatter regions comprise several polygons, preferably rectangles, wherein the polygons have different sizes and/or several, in particular all polygons, have a, preferably individual, marker appendage.

The orientation of the scatter pattern can be detected efficiently in this way by means of the contour diagram.

The object according to the invention is likewise solved by means of a scatter pattern element holding device for holding a scatter pattern element, in particular as described above, in order to provide the scatter pattern element on a processing plane of a laser scanner device, in particular of a laser scanner device as described above, wherein the scatter pattern element holding device has the following:

a base surface as well as a side wall revolving around the base surface in such a way that the scatter pattern element holding device forms a hollow space, wherein the side wall on an upper end is formed in such a way that the scatter pattern element can be supported so as to be fixed on the upper end in such a way that light of the laser scanner device can be irradiated through the scatter pattern element into the hollow space;

at least one deflection cone, which is arranged on the base surface, wherein the deflection cone is formed in such a way and/or is arranged so as to absorb light striking the deflection cone and/or to deflect it in the direction of an inner side of the side wall, wherein the inner side of the side wall is formed so as to absorb light striking the inner side of the side wall.

The speed and the precision of the above-described method for calculating a calibration function for a calibrated control of the deflection unit is determined, for example, by the contrast, which can be attained. The contrast is determined by means of the, optionally different, surface roughness of the scatter pattern element and the associated backscattering of the laser radiation in the direction of the photodiodes. Depending on a material of the scatter pattern element, however, approximately 90% up to almost 100% of the power of the laser light are transmitted through the scatter pattern element. Tests have shown that approximately 10% less light is transmitted in the scatter regions. It is thus significant for the contrast and the thermal management, how this power is caught. According to the invention, the light is thus absorbed downstream from the scatter pattern element on the inner walls of the hollow space of the scatter pattern element holding device.

In one embodiment, the inner side of the side wall and/or the deflection cone has a plurality of absorber lamellae. The absorber lamellae are preferably formed as elements with a triangular cross section. It is possible that the absorber lamellae have a pyramid shape.

It is made possible thereby that the light is absorbed efficiently. The contrast of the contour diagram is thus further increased and a calculating time is thus shortened, and the precision of the calibration function is increased.

In one embodiment, the upper end of the side wall is formed in such a way that the scatter pattern element can be supported in a floating manner. A floating support is to be understood as such a support of the scatter pattern element, according to which the scatter pattern element does not rest completely on a fastening section on the underside. A gap is preferably formed between the scatter pattern element and the deflection cone.

The upper end of the side wall is preferably formed in a ledge-like manner that the scatter pattern element can be placed onto this ledge.

The side wall on the upper end have, for example, a chamfer or an insertion groove.

It is likewise possible that the side wall has three or four bearing protrusions, for example in each case one bearing protrusion on a side of the side wall, for attaching the scatter pattern element 30.

Wherein corresponding chamfers, insertion grooves, or bearing protrusions can optionally be formed to be recessed (viewed from the upper end) in such a way that the scatter pattern element can be introduced so that the side wall on the upper end 44 positionally stabilizes or fixes, respectively, the scatter pattern element against (unwanted) movements.

It is made possible thereby to thermally and mechanically uncouple the scatter pattern element from the scatter pattern element holder, so that a thermal expansion of the scatter pattern element holder does not or cannot have an impact on the scatter pattern element, respectively.

In one embodiment, a deflection cone base surface covers essentially the entire base surface and/or a height of the deflection cone corresponds to at least half the height of the side wall, preferably to at least 80% of the height of the side wall.

The light can be guided efficiently to the inner walls in this way from different impact directions, where it can be absorbed. The contrast is thus further improved.

In order to be able to arrange a scatter pattern element at several positions, the scatter pattern element can preferably be supported in a displaceable manner. It is possible that, for example, a scatter pattern element holding device is supported in a displaceable manner in an XY plane.

In order to support a scatter pattern element and/or a scatter pattern element holding device in a displaceable manner, an arrangement can be provided, for example, on a cross table or XY table, respectively.

The object according to the invention is likewise solved by means of a scanning field correction system, wherein the scanning field correction system comprises at least one laser scanner device as described above, as well as at least one scatter pattern element for a scanning field correction, as described above, and preferably at least one scatter pattern element holding device, as described above.

It is pointed out at this point that the features and advantages described in the context of the method according to the invention, the laser scanner device according to the invention, and the scatter pattern element according to the invention, also apply for the scanning field correction system according to the invention.

Features of the method, in particular those, which relate to the detection of photodiode signals or the evaluation/analysis of the contour diagrams, can be transferred to the correction system according to the invention, in that the corresponding device is configured in such a way that it is suitable for performing the corresponding method features.

In one embodiment, the scanning field correction system comprises at least two scatter pattern elements, which differ in their size and/or in their scatter pattern.

For example, the calibrated control of the deflection unit can be verified or tested thereby. It is likewise conceivable to calibrate a calibration function by means of a second calibration function. The precision of the control of the deflection unit can thus be increased even further.

In one embodiment, the scanning field correction system comprises at least two laser scanner devices, the scanning fields of which overlap at least partially, wherein the laser scanner devices can be calibrated relative to one another with the help of the scatter pattern element.

In the case of several laser scanner devices, the respective scanning fields can be rotated and/or tilted relative to one another, for example due to unprecise (crooked) assembly of the corresponding laser scanning heads. A relative accuracy of a beam guidance of several laser beams to one another can be optimized with the help of a common calibration, which is in particular adapted to one another. Advantageous further developments follow from the subclaims.

The invention will also be described below with regard to further details, features, and advantages, which will be explained in more detail on the basis of the figures.

The described features and feature combinations, as shown below in the figures of the drawing and as described on the basis of the drawing, cannot only be used in the respective specified combination, but also in other combinations or alone, without thus leaving the scope of the invention.

FIG. 4 shows a schematic illustration of a contour diagram according to an exemplary embodiment, which is obtained by means of a correlation of the detected scatter radiation with the scanner coordinates;

FIG. 5 shows a top view onto an alternative exemplary embodiment of a scatter pattern element according to the invention;

FIG. 6 shows a schematic illustration of a contour diagram according to an alternative exemplary embodiment, which is obtained by means of a correlation of the detected scatter radiation with the scanner coordinates;

FIG. 7 shows a cross sectional view of an exemplary embodiment of a scatter pattern element holding device according to the invention;

FIG. 8 shows a cross sectional view of an exemplary embodiment of a scatter pattern element holding device according to the invention comprising a scatter pattern element;

FIG. 9 shows a cross sectional view of an alternative exemplary embodiment of a scatter pattern element holding device according to the invention;

FIG. 10 shows a schematic top view onto a scatter pattern holding device according to the invention according to an exemplary embodiment;

Figures 11, 12:
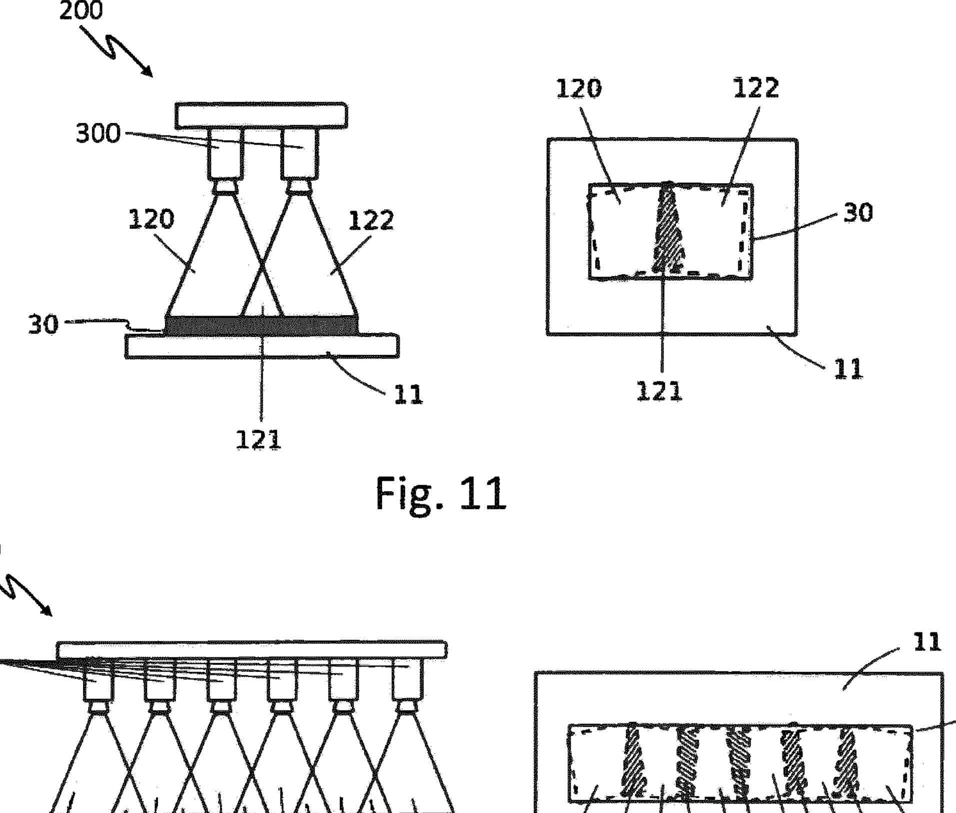
FIG. 11 shows an exemplary embodiment for a method for calibration or scanning field correction, respectively, of a scanning field correction system comprising two laser scanner devices and a common processing plane.
Figure 13:
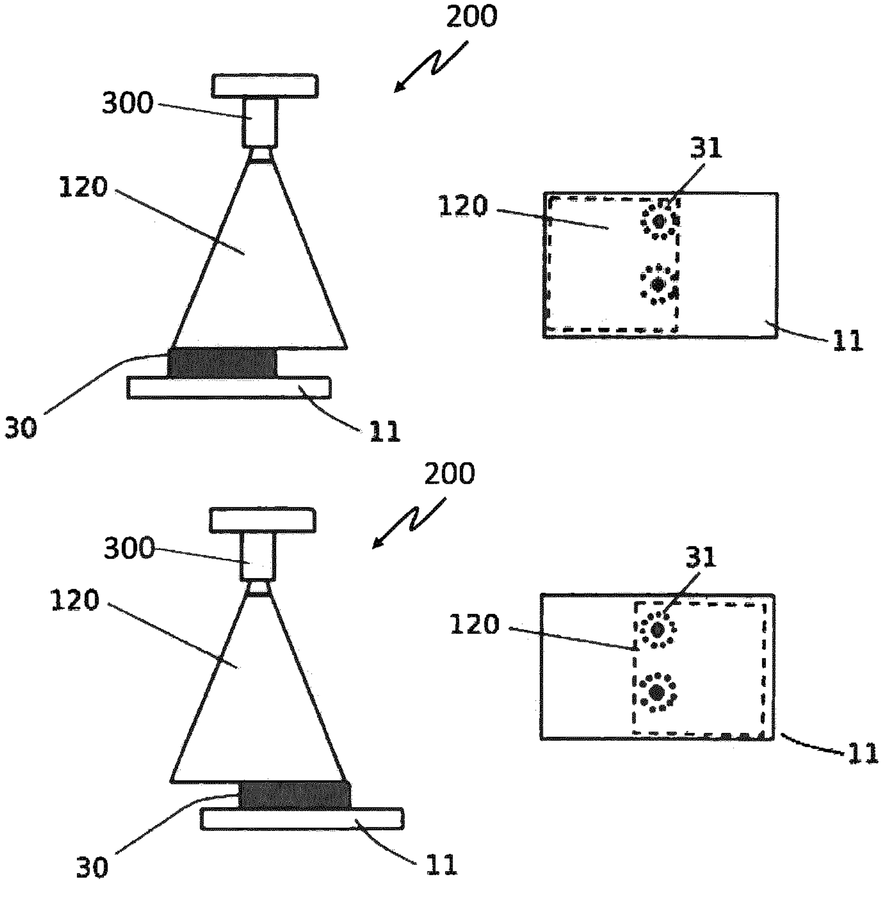

FIG. 12 shows an exemplary embodiment for a method for calibration or scanning field correction, respectively, of a scanning field correction system comprising a plurality of laser scanner devices and a common processing plane; and FIG. 13 shows an alternative exemplary embodiment for a method for calibration or scanning field correction, respectively, of a laser scanner device by displacing a scatter pattern element to several positions.

Figure 1:
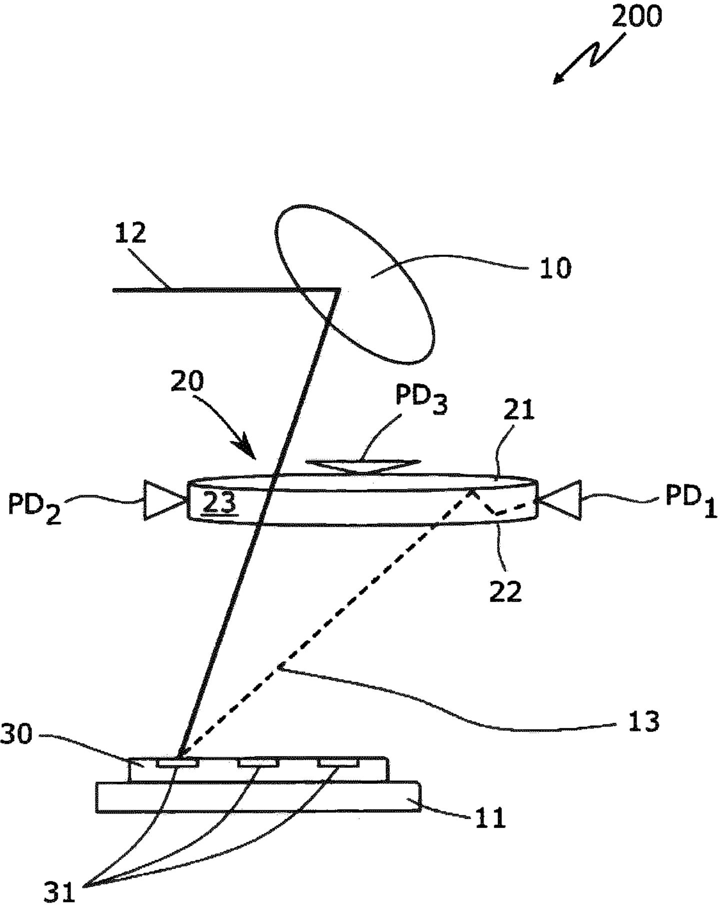
FIG. 1 shows a schematic view of an exemplary embodiment of a laser scanner device according to the invention comprising three photodiodes.

A schematic view of an exemplary embodiment of a laser scanner device according to the invention of a scanning field correction system 200 according to the invention is shown in FIG. 1.

The laser scanner device thereby comprises at least one laser light source (not illustrated in FIG. 1) for emitting a laser beam 12 as well as at least one deflection unit 10.

The deflection unit 10 can comprise, for example, a (deflection) mirror and a galvanometer scanner.

The laser beam 12 can be moved in three space coordinates x, y, z by means of the deflection unit 10 and optionally a further (non-illustrated) deflection unit.

A movement of the laser beam 12 in the three space coordinates x, y, z is to be understood that a spot of the laser beam can be moved on a processing plane 11 by means of the at least one deflection unit 10 in an x and y direction (in each case parallel to the processing plane 11 and optionally perpendicular to one another). A focus position, which may be present, can be moved/displaced in a z direction (perpendicular to the processing plane 11).

A window 20 is arranged between the deflection unit 10 and the processing plane 11. The window 20 can be, for example, a protective glass, which serves the purpose of irradiating the laser beam 12 into a work area, in which the processing plane 11 is arranged.

In one exemplary embodiment, the window serves the purpose of protecting the scanner interior against contamination (dust, smoke, (water) vapor) from the outside. In an enhancement of the invention, the laser scanner device can be hermetically closed by means of the window.

A scatter pattern element 30 is arranged on the processing plane 11 in FIG. 1. The scatter pattern element 30 has several scatter regions 31, which can be arranged in a pattern M.

In the exemplary embodiment according to FIG. 1, three photodiodes $PD_1$, $PD_2$, $PD_3$ are in each case arranged on a section of a window edge 23 of the window 20.

A (non-illustrated) fourth photodiode can additionally be present, which is arranged, for example, so as to be located opposite to the third photodiode $PD_3$.

For a scanning field correction according to the invention, the laser beam 12 can move along or scan, respectively, the processing plane 11 or the scatter pattern element 30 arranged on the processing plane, respectively, along predetermined scanner coordinates x and y.

The laser beam is subsequently deflected by the pattern M of the scatter pattern element 30 either according to the law of reflection (if the light does not strike one of the scatter regions 31) or is scattered (diffusely) by the scatter regions 31 or parts thereof.

The laser light 13, which is reflected back and/or scattered back (here generally referred to as scatter radiation 13, which can also comprise light, which is reflected back) passes through a window bottom side 22.

A part of the scatter radiation 13 spreads via (repeated) reflections and/or scattering(s) between a window top side 21 and a window bottom side 22 within the window 20 towards at least one section of a window edge 23 of the window 20 in such a way that the scatter radiation 13 escapes from the window edge 23 of the window 20 and can be detected there.

Due to the different surface roughness of the scatter pattern element 30, a contrast is created in the scatter radiation 13, which is reflected back/scattered back.

This scatter radiation 13 is collected via photodiodes $PD_1$, $PD_2$, $PD_3$, which are directed into the (interior) of the window 20, and is correlated with the scanner coordinates x, y, z.

When combining/correlating the photodiode signal of the photodiodes $PD_1$, $PD_2$, $PD_3$ with the scanner coordinates x, y, z to form a contour diagram K, a distorted and blurred image of the scatter pattern M is created due to the above-described distortion errors.

The necessary calibration function can be calculated from a comparison of this contour diagram K with a known reference image of the scatter pattern M.

An exemplary embodiment for a scatter pattern element 30 comprising a scatter pattern M according to this exemplary embodiment is described in more detail below in connection with FIG. 2.

The scatter pattern element 30 is formed in a plate-shaped manner, preferably of glass or glass ceramic, in particular fused silica or Zerodur® or Borofloat. These materials are suitable especially for high-performance lasers because they have a particularly high damage threshold. The materials additionally have a low heat expansion coefficient, whereby thermal influences are minimized.

Figure 2:
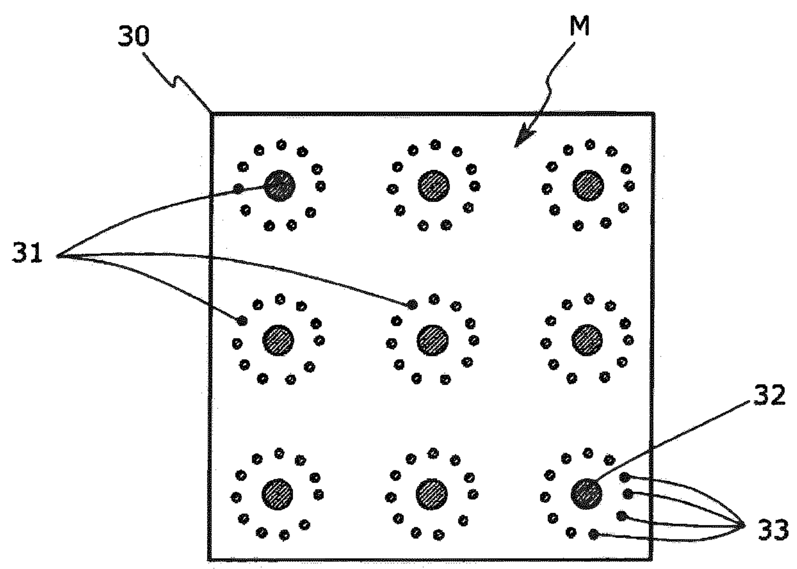
FIG. 2 shows a top view onto an exemplary embodiment of a scatter pattern element according to the invention.

The scatter pattern element 30 according to FIG. 2 is formed to be rectangular. According to the invention, however, the scatter pattern element can also be formed to be round or can have any shape, for example star-shaped.

The for the scatter pattern element 30 is in particular formed to be transparent for the wavelength of the laser beam 12, in order to avoid a destruction, for example by absorption of the light.

Alternatively, the scatter pattern element 30 can also consists (for lower laser power), for example, of paper or cardboard or of a metal.

The scatter pattern element 30 has a scatter pattern M on a surface, wherein the scatter pattern M comprises several scatter regions 31, wherein the scatter regions 31 are formed as roughened (for example by means of etching or sandblasting) and/or an imprinted (surface) regions of the scatter pattern element (30).

Alternatively or additionally, the scatter region 30 can at least partially be arranged within the volume of the scatter pattern element 30. For example, a scatter region of this type can be introduced by means of laser engraving. It is likewise conceivable that the scatter regions 30 comprise bores (holes).

The scatter regions 31 are arranged in the scatter pattern M in such a way that a (any) image of the scatter pattern M has an unambiguously identifiable orientation in each rotation or shape distortion or reflection or scaling or translation. It goes without saying that it is alternatively also possible according to the invention that the scatter regions 31 are formed so as not to scatter and that the remaining region of the scatter pattern element 30 is formed so as to scatter. A "negative" can thus also represent a formation according to the invention.

For this purpose, the scatter regions 31 can comprise a first arrangement of first marker regions 32 as well as a second arrangement of second marker regions 33.

In the exemplary embodiment according to FIG. 2, the first marker regions 32 are formed as circles, which are arranged in a regular 3×3 arrangement on the surface of the scatter pattern element.

Wherein each of the first marker regions 32 is surrounded by a plurality of the second marker regions 33.

The second arrangement of the plurality of second marker regions 33 differs for at least two, preferably for at least three, more preferably for each of the first marker regions 32, in particular in an angular arrangement and/or a number of the second marker regions 33.

Each of the first marker regions 32 can be unambiguously identified in this way. An unambiguous (geometric) assignability of the pattern M can be provided in such a way, so that an image of the scatter pattern M has an unambiguously identifiable orientation in each rotation, shape distortion and reflection, scaling or translation.

In order to design the image processing/detection and the manufacture of the scatter pattern element as simply as possible, for example only circles can be selected as marker region. This allows, for example, for any type of mask-related manufacture (sandblasting, etching), in the case of which no "islands" are possible. A further advantage consists in the "interpolation"/"fit accuracy" because the determination of the center point of the circle is less susceptible with regard to noisy edges.

Figure 3:
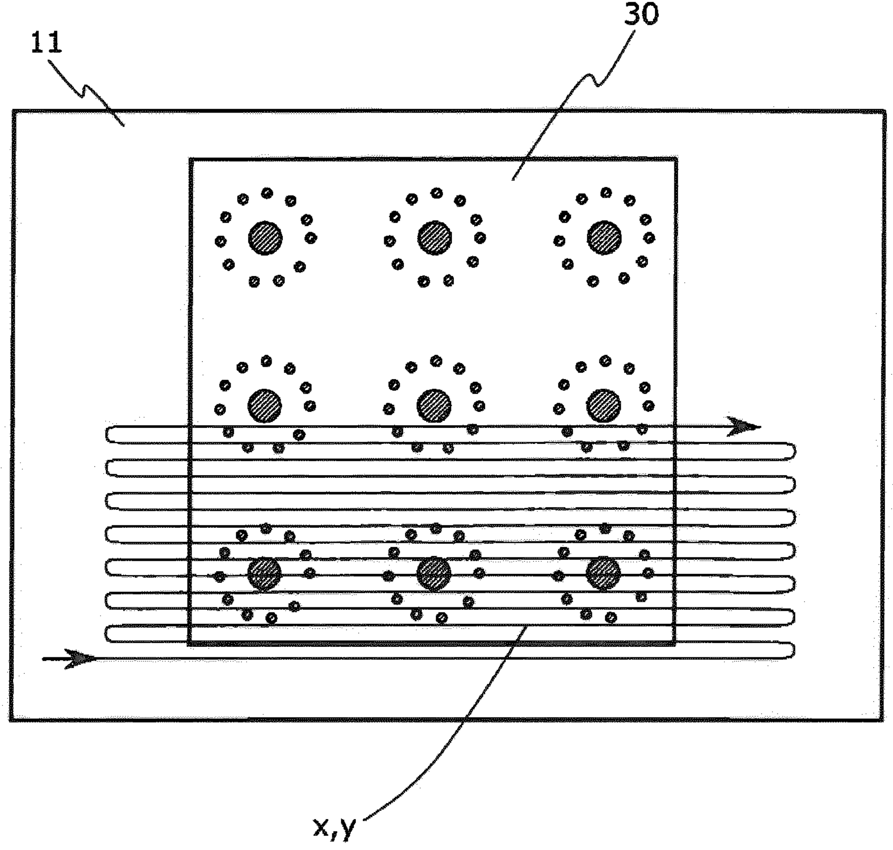
FIG. 3 shows a schematic view of an exemplary embodiment of an arrangement of a scatter pattern element on a processing plane by schematically suggesting a scanning of at least a part of the scatter pattern element on the processing plane by means of a laser beam along scanner coordinates.

A pass-over or scanning, respectively, of at least a part of the scatter pattern element 30 on the processing plane 11 by means of a laser beam 12 of the laser scanner device along scanner coordinates x, y, z or a corresponding trajectory, respectively, is shown in the exemplary embodiment according to FIG. 3.

A pass-over or scanning, respectively, of the scatter pattern element can also take place more often (one after the other), for example four times, in order to increase a contrast. An order (or starting point, respectively), a curve shape of the scan, or a speed of the scan can also be varied thereby.

The contour diagram K is calculated on the basis of a correlation of the scanner coordinate x, y, z and the photodiode signals, which are in each case detected for this purpose (one photodiode signal data set per scanner coordinate x, y, z).

FIG. 4 shows a schematic illustration of a contour diagram K according to an exemplary embodiment, which is obtained by means of a correlation of the detected scatter radiation 13 (see FIG. 1) with the scanner coordinates x, y, z (see FIG. 3) at a scatter pattern element 30 according to the exemplary embodiment in FIG. 2.

The contour diagram K has the coordinates x', y', z', wherein the coordinates x', y' essentially correspond to the scanner coordinates x, y, z (see FIG. 3) and z' represents an amplitude of the contour diagram.

The amplitude z' of the contour diagram K corresponds to an integrated and/or averaged signal (for example averaged over several scans) of several of photodiodes $PD_1$, $PD_2$, $PD_3$ (see FIG. 1).

For this purpose, an (essentially) conventional analog-to-digital conversion is provided, so that a unit of the amplitude z' is specified, for example, in "counts", or wherein the amplitude z' is standardized to 1 (standardized to the highest photodiode signal).

The contour diagram K thus shows a (distorted) image of the scatter pattern 30 or a scatter pattern image M', respectively, which corresponds to a distorted illustration of the scatter pattern M of the scatter pattern element 30.

The contour diagram K thus has several scatter region images 31, which can be assigned, preferably unambiguously, to the several scatter regions 31 of the scatter pattern element 30.

The contour diagram K is compared to a (non-illustrated) reference image of the scatter pattern element 30 on a calculation unit.

The reference image of the scatter pattern element 30 can be generated, for example, by means of a high-resolution photograph of the scatter pattern element 30, or by means of a measurement of the scatter pattern element 30 by means of a coordinate measuring machine.

It is likewise conceivable, for example, to use raw data (coordinate raw data) as reference image of the scatter pattern element 30, which is/was used for a (laser) printing method for generating the scatter pattern M of the scatter pattern element 30.

Different fit and/or interpolation methods can be used to determine the deviation of the contour diagram K from the scatter pattern M or from the reference image of the scatter pattern element 30, respectively. Further image processing steps/data processing steps, such as, for example, a contrast enhancement and/or a threshold analysis, can optionally be performed.

To determine the deviation, in particular by using the steps described in the preceding paragraph, contour diagram reference points are determined, for example focal points and/or central points and/or shape distortions (for example “oval” instead of circle”) of several scatter region images 31' of the contour diagram K.

A grid can be generated from the contour diagram reference points, in the case of which each contour diagram reference point contains information about the x and y positions as well as the (optimal) focus position.

A pre-distortion function or the calibration function, respectively, can be calculated from the comparison of the contour diagram reference points for the undistorted, regular reference image of the scatter pattern M of the scatter pattern element 30 (or pre-determined reference points of the reference image, respectively).

The calibration function serves, for example, for compensating the pincushion barrel distortion or other distortions, which can be created during the control of the deflection unit 10 (see FIG. 1).

The calibration function, including z values (=(optimal) focus position) is completed via interpolation between the contour diagram reference points and/or corresponding reference points of the reference image of the scatter pattern M.

FIG. 5 shows a top view onto an alternative exemplary embodiment of a scatter pattern element 30 according to the invention comprising a scatter pattern M.

According to the exemplary embodiment of the scatter pattern element 30 in FIG. 5, the scatter pattern element 30 has scatter regions 31 in the form of several polygons 34.

These polygons can comprise, for example, rectangles or lines or straight lines 34, respectively. Alternatively or additionally, the polygons or the scatter regions can also comprise barcodes or QR codes or numbers and/or letters.

The polygons have different sizes and form a cascaded arrangement with a reticle.

Each or some of the polygons 34 have a, preferably individual, marker appendage 35.

The marker appendage 35 according to the exemplary embodiment in FIG. 5 comprises a line marking, wherein four rectangles 34 in each case has/have one, two, three, four line marking(s).

An unambiguous (geometric) assignability of the pattern M can be provided in this way, so that an image of the scatter pattern M has an unambiguously identifiable orientation in each rotation, shape distortion and reflection, scaling or translation.

FIG. 6 shows a schematic illustration of a contour diagram K according to an exemplary embodiment, which is obtained by means of a correlation of the detected scatter radiation 13 (see FIG. 1) with the scanner coordinates x, y, z (see FIG. 3) at a scatter pattern element 30 according to the exemplary embodiment in FIG. 5.

With regard to the further statements and the evaluation or the analysis, respectively, and the pre-distortion function or calibration function, respectively, which can be calculated therefrom, reference is made to the statements relating to FIG. 4.

A cross sectional view of an exemplary embodiment of a scatter pattern element holding device 40 according to the invention is illustrated in FIG. 7.

The speed and the precision of the above-described method for calculating a pre-distortion function or a calibration function, respectively, for a calibrated control of the deflection unit is determined, for example, by the contrast, which can be attained (in the contour diagram K). The contrast is determined by means of the (different) surface roughness of the scatter pattern element 30 and the associated backscattering of the laser radiation 13 in the direction of the photodiodes $PD_1$, $PD_2$, $PD_3$ (see FIG. 1).

Depending on a material of the scatter pattern element, however, approximately 90% up to almost 100% of the power of the laser light are transmitted through the scatter pattern element 30. Tests have shown that approximately 10% less light is transmitted in the scatter regions.

It is thus significant for the contrast and the thermal management, how this power is caught and is preferably not scattered back to the photodiodes.

According to the invention, the light is thus absorbed after a transmission through the scatter pattern element 30 on the inner walls of a hollow space 43 of a scatter pattern element holding device 40.

The scatter pattern element 30 can be provided on a processing plane 11 (see FIG. 1) by means of the scatter pattern element holding device 40. Specifically for high laser powers, for example 50 W or 100 W or more, a contrast of the contour diagram can be improved significantly in this way because (unwanted) backscatterings are avoided (for the most part) or are reduced significantly, respectively.

The scatter pattern element holding device 40 has a base surface 41 as well as a side wall 42 revolving around the base surface.

In the interior, the scatter pattern element holding device 40 thus forms a hollow space 43.

The side wall 42 is formed in such a way on an upper end that the scatter pattern element 30 can be supported so as to be fixed on the upper end 44.

Wherein the upper end 44 of the side wall 42 is located opposite to an end, on which the base surface 41 is adjacent to the side wall 42.

For this purpose, the side wall 42 can have, for example, a corresponding chamfer or an insertion groove on the upper end 44. It is furthermore possible that the upper end 44 of the side wall 42 is formed in a ledge-like manner.

It is likewise conceivable that the side wall 42 has three or four bearing protrusions, for example in each case one bearing protrusion on a side of the side wall 42, for attaching the scatter pattern element 30.

Wherein corresponding chamfers, insertion grooves, or bearing protrusions can optionally be formed to be recessed (viewed from the upper end 44) in such a way that the scatter pattern element 30 can be introduced so that the side wall 42 on the upper end 44 positionally stabilizes or fixes, respectively, the scatter pattern element against (unwanted) movements.

The scatter pattern element holding device 40 further has at least one deflection cone 45, which is arranged on the base surface 41.

The at least one deflection cone 45 is formed and/or arranged so as to deflect incident light in the direction of an inner side 46 of the side wall 42.

The inner side 46 of the side wall 42 is formed so as to absorb light striking the inner side 46.

For this purpose, the side wall 42 can have absorber lamellae 47. Alternatively or additionally, further absorbing or diffusely scattering elements can be provided within the hollow space 43.

A deflection cone base surface covers essentially the entire base surface 41, wherein, alternatively, the deflection cone base surface can also be formed to be slightly smaller than the base surface 41.

A height of the deflection cone 45 corresponds to at least half the height of the side wall 42, preferably to at least 80% of the height of the side wall 42. Entering light can be absorbed over a large entrance angle range in this way.

The exemplary embodiment for a scatter element holding device 40 according to FIG. 7 is shown in FIG. 8, wherein the scatter element holding device 40 holds a scatter pattern element 30.

FIG. 9 shows an alternative exemplary embodiment of a scatter element holding device 40.

A “tip” or an apex angle of the deflection cone 45, respectively, is directed at the base surface 41 here. In this exemplary embodiment, the deflection cone 45 can have absorber lamellae 47 or the deflection cone 45 (itself) can form the inner side 46 of the side wall 42.

A schematic top view onto a scatter pattern holding device 40 according to an exemplary embodiment is illustrated in FIG. 10.

The scatter pattern holding device 40 holds a scatter pattern element 30. The scatter pattern element 30 is formed to be transparent for a laser wavelength. The portion of the laser light, which is not scattered to the photodiodes $PD_1$, $PD_2$, PD 3 (see FIG. 1), can enter into the hollow space 43 (below the scatter pattern element 30) in this way and is absorbed there.

The scatter pattern element 30 is held in the scatter pattern holding device 40 in such a way that the transmitted power is absorbed completely, without thereby damaging the scatter pattern holding device 40.

The scatter pattern element 30 is further thermally and mechanically uncoupled from the scatter pattern holding device 40, so that the thermal expansion thereof does not have any impact on the scatter pattern element 30.

In the case of high laser powers, the components can heat up significantly. In order to avoid, for example, a resulting curvature due to thermal expansion of the scatter pattern element 30 here, the scatter pattern holding device 40 can be (actively) cooled, for example water-cooled, in a further form of the invention.

The scatter pattern element holding device 40 can consist, for example, of (anodized) aluminum or another material with good heat conductivity, in order to be able to discharge heat and so as not to be damaged by the laser power.

FIG. 11 shows a schematic exemplary embodiment for a method for calibration or scanning field correction, respectively, of a scanning field correction system 200 comprising two laser scanner devices 300 comprising a scatter pattern element 30 and a common processing plane 11.

The photodiodes as well as the window are not shown here. For the description of the corresponding arrangement or features of the scatter pattern element 30, reference is explicitly made to the preceding exemplary embodiments.

In the method according to this exemplary embodiment, a calibration function according to the invention is calculated for each of the two laser scanner devices 300.

By applying the calibration function(s), the respective scanning fields 120, 122 of the corresponding laser scanner device 300 are in each case “distorted” or corrected, respectively, on their own according to distortions.

In the case of several laser scanner devices 300, however, the scanning fields 120, 122 can (additionally) be rotated and/or tilted relative to one another, for example by means of unprecise (crooked) assembly of the laser scanning heads. See schematically suggested (tilted) scanning fields 120, 122 in the top view onto the processing plane 11 on the right in FIG. 11.

This is why the laser scanner devices 300 have to still be corrected/calibrated relative to one another in order to obtain the most exact calibration as possible of the laser scanning system.

In order to correct relative errors of this type between several laser scanner devices 300, the two laser scanner devices 300 scan the same, overlapping region 121 (overlapping region 121 of the two scanning fields 120, 122) on the scatter pattern element 30.

The two resulting contour diagrams K are subsequently brought to congruence by means of rotation/tilting, and the laser scanner devices 300 are corrected by means of the resulting calibration function(s).

The method described in connection with the exemplary embodiment according to FIG. 11 can also be transferred to a plurality of laser scanner devices 300 (in any arrangement).

FIG. 12 shows an exemplary embodiment comprising a plurality of—for example six—laser scanner devices 300 of a scanning field correction system 200 comprising respective scanning fields 120, 122, 124, 126, 128, 130. As also described in connection with FIG. 11, respective overlapping regions 121, 123, 125, 127, 129 of adjacent scanning fields 120, 122, 124, 126, 128, 130 can be scanned on the scatter pattern element 30.

The respective resulting contour diagrams K are subsequently brought into congruence by means of rotation/tilting, and the laser scanner devices are corrected by means of the resulting calibration function(s).

In the exemplary embodiments according to FIGS. 11 and 12, comparatively large scatter pattern elements 30 are used (compared to the scanning fields or the processing plane).

In an alternative exemplary embodiment according to FIG. 13, the above-described method can be used for the scanning field correction of a (large) scanning field 120 by means of repositioning (use of different positions) of a scatter pattern element 30 on the processing plane 11.

For generalization purposes or for a favorable manufacturability (in terms of production costs and effort) of the scatter pattern element 30 or of a corresponding scatter pattern element holding device, respectively, it can be advantageous to use a comparatively small scatter pattern element 30 (compared to the scanning fields or the processing plane) for the scanning field correction of a (significantly) larger scanning field 120.

In order to nonetheless be able to measure the distortion of the entire or at least of a majority of the scanning field 120, the scanning pattern element 30 is repositioned in the scanning field 120.

The scanning pattern element 30 is thereby first positioned in a first position relative to the scanning field 120 and is scanned by means of a laser beam, and a corresponding first calibration function is calculated (FIG. 13, top).

The scatter pattern element 30 is subsequently first arranged in a second position relative to the scanning field 120 and is scanned by means of the laser beam, and a corresponding second calibration function is calculated (FIG. 13, bottom).

By means of overlapping measurement (passing over/scanning by means of the laser beam) of the same region or of the same scatter regions 31 of the scatter pattern element 30, respectively, the calibration functions (first and second calibration function), which are in each case intended for a part of the scanning field 120, can be correlated with one another.

In order to be able to arrange a scanning pattern element 30 at several positions, the scanning pattern element 30 can preferably be supported in a displaceable manner. It is possible that, for example, a scatter pattern element holding device is supported in a displaceable manner in an XY plane.

It is important to point out at this point that all of the above-described parts alone and in any combination, in particular the details illustrated in the drawings, are claimed as being essential for the invention.

LIST OF REFERENCE NUMERALS

10 deflection unit
11 processing plane
12 laser beam
13 scatter radiation
20 window
21 window top side
22 window bottom side
23 window edge
30 scatter pattern element
31 scatter regions
31' scatter region images
32 first marker regions
33 second marker regions
34 polygon
35 marker appendage
40 scatter pattern element holding device
41 base surface
42 side wall
43 hollow space
44 upper end of the side wall
45 deflection cone
46 inner side
47 absorber lamellae
120, 122, 124, 126, 128, 130 scanning fields
121, 123, 125, 127, 129 overlapping regions
200 scanning filed correction system
300 laser scanner device
K contour diagram
M scatter pattern
M' scatter pattern image
$PD_1$, $PD_2$, $PD_3$ photodiodes
x, y, z scanner coordinates
x', y', z' coordinates of the contour diagram

The invention claimed is:

1. A method for a scanning field correction of at least one laser scanner device (300), wherein the method has the following steps:

providing a scatter pattern element (30) on a processing plane (11), wherein the scatter pattern element (30) has at least one scatter region (31), which is arranged in a scatter pattern (M);

passing over or scanning, respectively, at least a part of the scatter pattern element (30) on the processing plane (11) by means of a laser beam (12) of the at least one laser scanner device (300) along scanner coordinates (x, y, z), wherein the laser beam passes through at least one window (20), preferably protective glass, between a deflection unit (10) and the processing plane (11);

detecting scatter radiation (13), which can be generated by scattering and/or reflection of the laser beam (12) when passing over or scanning, respectively, the at least one scatter region (31);

creating a contour diagram (K) by a correlation of the detected scatter radiation (13) with the scanner coordinates (x, y, z);

comparing the contour diagram (K) with a reference image of the scatter pattern (M) and determining a deviation of the contour diagram (K) from the reference image of the scatter pattern (M);

calculating a calibration function for a calibrated control of the deflection unit (10) on the basis of the determined deviation, whereby the contour diagram (K) comprises a scatter pattern image (M'), which corresponds to a distorted illustration of the scatter pattern (M) of the scatter pattern element (30) in such a way that the contour diagram (K) has at least one scatter region image (31'), which can be assigned to the at least one scatter region (31) of the scatter pattern element (30), in particular can be assigned unambiguously.

2. The method according to claim 1, characterized in that a part of the scatter radiation (13) spreads via reflection and/or scattering between a window top side (21) and a window bottom side (22) within the window (20) at least towards a section of a window edge (23) of the window (20) in such a way that the scatter radiation (13) escapes from the window edge (23) of the window (20) and can be detected there.

3. The method according to claim 1, characterized in that the detection of the scatter radiation (13) takes place on at least one section of a/the window edge (23) of the window (20).

4. The method according to claim 1, characterized in that the detection of the scatter radiation takes place by means of at least one, preferably two, more preferably at least three photodiode(s) ($PD_1$, $PD_2$, $PD_3$), wherein several photodiodes ($PD_1$, $PD_2$, $PD_3$) are preferably distributed equidistantly.

5. The method according to claim 1, characterized in that an amplitude of the contour diagram (K) is essentially proportional to the detected scatter radiation (13).

6. The method according to claim 1, characterized in that the step for determining the deviation of the contour diagram (K) from the scatter pattern (M) comprises a step for the, preferably partial, fitting and/or interpolation of the contour diagram (K).

7. The method according to claim 1, characterized in that the step for determining the deviation of the contour diagram (K) from the scatter pattern (M) comprises a step for determining contour diagram reference points, in particular of focal points and/or central points and/or shape distortions of several scatter region images (31') of the contour diagram (K).

8. The method according to claim 1, characterized in that the step for determining the deviation of the contour diagram (K) from the scatter pattern (M) comprises a step for determining a deviation and/or shape distortions of contour diagram reference points from corresponding reference points of the reference image of the scatter pattern (M).

9. A laser scanner device (300) comprising a scanning field-correctable deflection unit (10), wherein the laser scanner device (300) has the following:

at least one deflection unit (10), which is formed to pass over or to scan, respectively, a processing plane (11) by means of a laser beam (12), along predetermined scanner coordinates (x, y, z), wherein a scatter pattern element (30) can be arranged on the processing plane, wherein the scatter pattern element (30) has at least one scatter region (31), which is arranged in a scatter pattern (M);

at least one window (20), preferably protective glass, which is arranged between the deflection unit (10) and the processing plane (11);

at least one photodiode ($PD_1$, $PD_2$, $PD_3$), which is formed to detect scatter radiation (13), which can be generated by means of scattering and/or reflection of the laser beam when passing over the at least one scatter region (31) of the scatter pattern element (30);

a calculation unit, which is formed to create a contour diagram (K) by means of a correlation of the detected scatter radiation (13) with the scanner coordinates (x, y, z), and to calculate a calibration function for a calibrated control of the deflection unit (10) on the basis of a deviation of the contour diagram (K) from a reference image of the scatter pattern (M), whereby the contour diagram (K) comprises a scatter pattern image (M'), which corresponds to a distorted illustration of the scatter pattern (M) of the scatter pattern element (30) in such a way that the contour diagram (K) has at least one scatter region image (31'), which can be assigned to the at least one scatter region (31) of the scatter pattern element (30), in particular can be assigned unambiguously.

10. The laser scanner device (300) according to claim 9, characterized by two, preferably at least three, photodiodes ($PD_1$, $PD_2$, $PD_3$), which are arranged on a section of the window edge (23) of the window (20).

11. The laser scanner device (300) according to claim 9, characterized in that the at least one photodiode, preferably two, more preferably at least three, photodiodes ($PD_1$, $PD_2$, $PD_3$) is/are formed and/or arranged to detect a part of the scatter radiation (13), which spreads via reflections and/or scattering between a window top side (21) and a window bottom side (22) within the window (20) towards a section the window edge (23) of the window (20).

12. The laser scanner device (300) according to claim 9, characterized in that the at least one photodiode ($PD_1$, $PD_2$, $PD_3$) is formed to output a measuring signal to the calculation unit, which is essentially proportional to the detected scatter radiation (13).

13. The laser scanner device (300) according to claim 9, characterized in that an amplitude of the contour diagram (K) is essentially proportional to the detected scatter radiation (13) or to the measuring signal of the at least one photodiode ($PD_1$, $PD_2$, $PD_3$), respectively.

14. A scatter pattern element (30) for performing a method for a scanning field correction of a laser scanner device (300), according to a method of claim 1, wherein the scatter pattern element (30) is formed in a plate-shaped manner, preferably of glass or glass ceramic, in particular fused silica or Zerodur® or Borofloat, and has a scatter pattern (M), wherein the scatter pattern (M) comprises several scatter regions (31), wherein the scatter regions (31) are formed as roughened and/or imprinted surface regions and/or holes of the scatter pattern element (30) or within the volume of the scatter pattern element (30), wherein the scatter regions (31) are arranged in the scatter pattern (M) in such a way that an image of the scatter pattern (M) or of a part thereof can be unambiguously identified in each rotation or shape distortion or reflection or scaling or translation.

15. The scatter pattern element (30) according to claim 14, characterized in that the scatter regions (31) comprise a first arrangement of first marker regions (32), preferably essentially circular first marker regions (32), wherein each of the first marker regions (32) is surrounded by a plurality of second marker regions (33), preferably essentially circular second marker regions (33), in a second arrangement.

16. The scatter pattern element (30) according to claim 15, characterized in that the second arrangement of the plurality of second marker regions (33) for at least two, preferably for at least three, more preferably for each of the first marker regions (32), differs in particular in an angular arrangement and/or a number of the second marker regions (33).

17. The scatter pattern element (30) according to claim 14, characterized in that the scatter regions (31) comprise several polygons (34), preferably rectangles (34), wherein the polygons have different sizes and/or several, in particular all polygons (34), have a, preferably individual, marker appendage (35).

18. A scanning field correction system (200), comprising at least one laser scanner device (300) according to claim 9, as well as at least one scatter pattern element (30) for a scanning field correction.

19. The scanning field correction system (200) according to claim 18, comprising at least two laser scanner devices (300), the scanning fields (120, 122, 124, 126, 128) of which overlap at least partially, wherein the laser scanner devices (300) can be calibrated relative to one another with the help of the scatter pattern element (30).

* * * * *